Oct. 25, 1932.  A. R. STEVENS ET AL  1,884,344
FRUIT DRYING APPARATUS
Filed Jan. 10, 1929
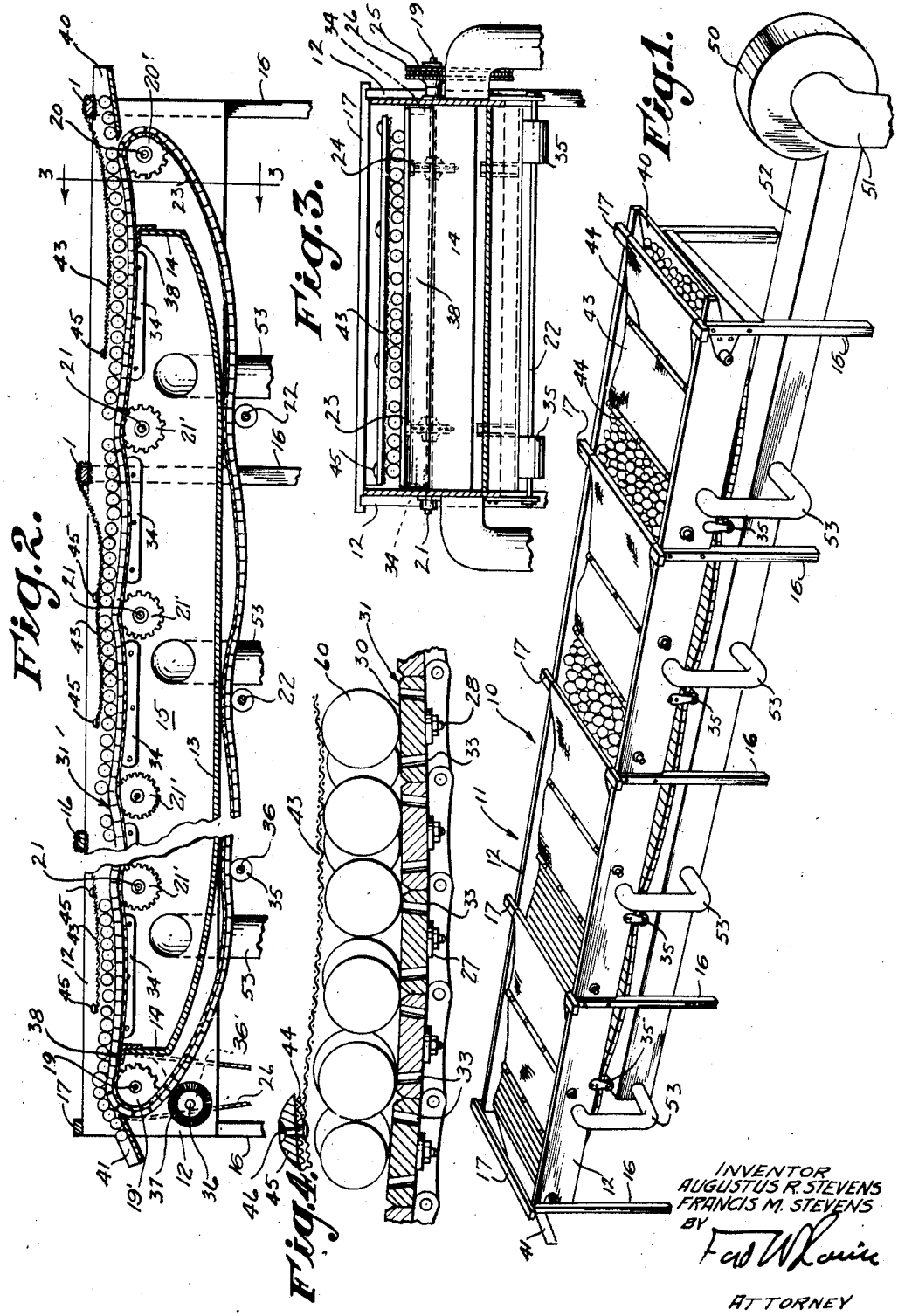
INVENTOR
AUGUSTUS R. STEVENS
FRANCIS M. STEVENS
BY
ATTORNEY Patented Oct. 25, 1932

1,884,344

UNITED STATES PATENT OFFICE

AUGUSTUS R. STEVENS AND FRANCIS M. STEVENS, OF LINDSAY, CALIFORNIA, ASSIGNORS TO FOOD MACHINERY CORPORATION, OF SAN JOSE, CALIFORNIA, A CORPORATION OF DELAWARE

FRUIT DRYING APPARATUS

Application filed January 10, 1929. Serial No. 331,503.

Our invention relates to a novel drying apparatus which finds particular utility in the citrus fruit-packing art, as well as in other arts where it is desirable to quickly remove a liquid from the outer surfaces of a large number of individual articles.

For illustrative purposes only, our invention will be referred to herein as an orange drier.

In the citrus fruit-packing art, oranges are usually scrubbed in a washer, rinsed, and dried before being segregated according to size and quality and packed for shipment.

To design other citrus packing equipment for volume appears not to be difficult, but never before has there been produced a drier which will handle large volumes of fruit, be gentle with it, and yet get it dry, even when the temperature is unusually low or the humidity high.

The orange drier in common use conveys the fruit on a wide, rotating roller conveyer some fifty to one hundred feet, turning the fruit constantly, while fans blow air downward against the fruit.

The constant rolling of the fruit on a roller drier frequently crowds and crushes the fruit. The fruit thus crushed sticks to the rolls giving these an exceedingly uneven surface which eventually causes additional damage to practically all the fruit passed through the drier.

It is an object of our invention to provide a drier through which the fruit will pass without its being crushed.

It is a further object of our invention to provide a drier through which fruit will be conveyed without more handling than is necessary to submit the several surfaces thereof to a drying agent.

Another great disadvantage of the roller drier is that these rolls become coated with material deposited from the oranges, which has an exceedingly detrimental effect upon the fruit and which it is therefore necessary to clean off at frequent intervals at considerable expense.

It is a further object of our invention to provide a drier having a means for inexpensively removing any deposits which may be left upon the fruit-contacting surfaces of the drier.

Besides the above-noted disadvantages the roller drier in general use is comparatively expensive to construct, and besides the frequent cleaning of the rolls which is necessary, considerable attention must be given each year to the bearings in the ends of the rolls.

It is therefore a further object of our invention to provide a drier in which the rotating roller conveyor is eliminated and the same function of these rollers performed at a materially smaller expense.

In using a roller drier it is frequently impossible to get fruit dry when the temperature is low or the humidity is unusually high. We have found this is largely due to inefficient use of air, and it is therefore a still further object of our invention to provide a drier which will utilize air with an efficiency which will permit satisfactory drying results under the most unfavorable weather conditions.

Further objects and advantages will be made evident hereinafter.

In the drawing,—

Fig. 1 is a perspective view of a preferred embodiment of our invention.

Fig. 2 is a fragmentary longitudinal vertical sectional view of the invention.

Fig. 3 is a transverse vertical section taken on the line 3—3 of Fig. 2.

Fig. 4 is an enlarged sectional view illustrating the interstitial wall of our invention and the manner in which the fruit carried thereon is dried.

Referring specifically to the drawing, a drier 10, herein illustrated as embodying our invention, includes a box structure 11 having side plates 12, a bottom plate 13, end plates 14, forming an air chamber 15, the box structure being supported on legs 16. Cross members 17 connect the upper ends of the legs 16 and strengthen the box structure 11.

Journalled in suitable bearings mounted on the side plates 12 are end shafts 19 and 20, upper intermediate shafts 21, and lower intermediate shafts 22. The shafts 19, 20, and 21 carry sprockets 19', 20', and 21', suitably spaced apart so as to mesh with and act as supporting structures for the endless chains 23 and 24. The shaft 19, as illustrated in Fig. 3, has provided upon one end thereof a sprocket 25 with which a chain 26 is adapted to mesh for the purpose of turning the shaft 19 and rotating the endless chains 23 and 24 about the respective sprockets which mesh with and support these.

Each link of each of the chains 23 and 24 is provided with a lug 27, and the lugs of each pair of corresponding links of the chains 23 and 24 are attached by suitable flat-headed bolts 28 to the opposite ends of one of a large number of slats 30, the chains 23 and 24 cooperating with the slats 30 to form an interstitial endless belt member.

These slats are rectangular in cross-section, with their upper edges beveled off, as clearly shown in Fig. 4. These slats are of such width that when the chains 23 and 24 are permitted to sag, as shown in Figs. 2 and 4, the slats unite to form an interstitial wall 31 which resists sagging between points of support below a curvature approximately indicated in Fig. 2.

For a purpose to be described later, each of the slats 30 is provided with a large number of perforations 33, these generally being inclined slightly from normal between the upper and lower surfaces of the slats so as to be non-parallel relative to each other.

Secured to inner faces of the side walls 12 are suitable tracks 34, having upper surfaces which fit the lower surface of the interstitial wall 31 where this sags between supporting sprockets on the shafts 19, 20, and 21.

Mounted on shafts 22 are suitable flat-surfaced rollers 35 upon which the slats 30 rest as they are carried underneath the box bottom 13.

Journalled in suitable bearings mounted upon the side walls 12 is a shaft 36 having a sprocket 36' on one end thereof which meshes with the chain 26, this shaft having a rotary brush 37 mounted thereon between the side walls 12 so that this brush is constantly rotated during the operation of the drier and brushes against the outer surface of the slats 30 as these pass by the brush 37.

Provided upon upper edges of the end walls 14 are flexible flaps 38 which bear against the lower surface of the interstitial wall 31 so that this wall substantially covers the upper open end of the box structure 11 so as to form an end closure for the air chamber 15.

Obviously the chains 23 and 24 are adapted to be rotated by the shaft 19 so that the slats carried on the upper flights of these chains will move from right to left in Fig. 2.

Fruit is adapted to be delivered into the right end of the interstitial wall 31 by a chute 40 and to be conveyed away from the left end of this interstitial wall by a chute 41, the interstitial wall acting as a supporting deck for the fruit.

Connected at one edge to each of the cross bars 17 (except the cross bar to the extreme left) is one of a plurality of fabric drags 43 which may be formed of canvas or light towelling, each of which is provided with suitable reinforcing tape strips 44 which are weighted down by a plurality of metal buttons 45 secured in any suitable manner, as by rivets 46, to the tape 44.

Disposed at one end of the box structure 11 is an air-blower 50 which is operated by a suitable source of power, not shown, so as to draw hot air or other drying medium from a furnace, not shown, through a pipe 51 and discharge this medium through a manifold pipe 52 and feeder pipes 53 into the chamber 15 within the box structure 11. The purpose of the non-parallel holes 33 in the slats 30 of the interstitial wall 31 is to direct the air from the chamber 15 directly against the lower surfaces of the fruit, so that the air will completely envelop the latter during its movement upon the wall 31.

The operation of our invention is as follows:

Through the chain 26 the shaft 19 is rotated as previously described, and fruit is introduced through the chute 40 on the right-hand end of the interstitial wall 31. This fruit as it is carried leftward lifts up the first of the drags 43, which rests in fairly light contact with the fruit, so that only where a single piece of fruit stands unsupported by other fruit is it rotated upon the interstitial wall 31 by contacting with this drag 43.

The beforementioned furnace being heated, the fan 50 is set in operation and hot air is introduced into the chamber 15. This hot air has no other way to escape than upwardly, and as the slats 30 are of such length as to run very close to the side walls 12, most of this air escapes through the perforations 33 and is directed against the surfaces of oranges 60, which, as shown in Fig. 4, are carried along on the slats 30. The heated air thus discharged is confined about the fruit by the drags 43 so that the air must pass horizontally between the fruit to reach the edge of the drag and be discharged into the atmosphere. This gives ample opportunity for the air to become saturated before it is released and insures maximum use of the heated air. One such station might be sufficient for some purposes, but applicant has provided a plurality of treating stations spaced apart wherein the fruit or the like receives substantially the same treatment during its passage through the machine. If the fruit happens to be excessively wet the first station will remove a large part of the moisture, this moisture laden air will then be dissipated from the fruit during its passage to the next station and as it passes under the next drag member it encounters new air to absorb additional moisture therefrom while passing under the drag member at this station, this air is then dissipated when it passes from under the drag members and another new lot of air is brought into contact with the fruit at the next station where all of the residual moisture will be removed. Applicant thereby provides a method of operation that gives successive like treatments to the stream of fruit as it passes the several stations provided, and the space between stations being free and open to the atmosphere on the top of the stream of fruit allows the moisture laden air to escape upward away from the fruit, assisted thereby, by the effort of the air in the chamber underneath the stream of fruit to escape upward through the fruit. Then as the fruit passes under the next succeeding drag member new air comes into contact with the fruit and moves along therewith until it in turn escapes after passing the drag member. Such succeeding steps in the process of successive drying enables the most efficient use of the air and drys the fruit in a manner that is highly satisfactory.

It is of great importance that the fruit be rotated from time to time as it passes from one end of the interstitial wall 31 to the opposite end. This is accomplished by the wavy shape of the interstitial wall 31 which results from its sagging between its supporting sprockets on the shafts 19, 20, and 21.

Thus, as the fruit approaches the high points or crests in the interstitial wall 31, which occur directly over the sprockets 21' on the shafts 21, the fruit tends to lag back, creating open spaces over these crests. As the fruit is crowded over these open spaces, however, it rolls over once or twice and presents new surfaces to the air in the next wave of the wall 31.

The drying is thus very efficiently carried out and we have found that in any except very unfavorable weather the fruit will be dried in half the length of a forty-eight foot drier.

The constant action of the brush 31 upon the outer surface of the slats 30 removes any matter which may have been deposited thereon by the fruit. It will be seen that there is no opportunity for crushing fruit carried on the interstitial wall 31, as the combined upper surfaces of the slats 30 provide practically a flat rolling surface for the fruit 60.

Moreover, it is to be noted that there is practically no wear of the slats 30 as they are rigidly fixed to the links of the chains 23 and 24. In fact, there is very little wear in the entire drier, and instead of having to be overhauled every year as is usually the case with the roller drier, our drier will run satisfactorily for over five years before there is any necessity for it being overhauled. Even then, the cost of this repair work will be nominal compared with the cost of rebushing the ends of all the rolls of a roller drier fifty or sixty feet in length.

While we have shown it as preferable to direct the air through the interstitial wall 31 in different angular planes, it is to be understood that under certain circumstances, air might be delivered in other ways and produce satisfactory results with the form of drier illustrated herein.

It is to be further noted that while we have shown but a single embodiment of our invention, many changes and modifications might be made in this without departing from the spirit of the invention or the scope of the appended claims.

We claim as our invention:

1. An apparatus for drying fruit or the like comprising an endless conveyor for supporting and moving fruit, an open top air distributing chamber over which said conveyor moves and forms a substantial closure therefor, openings in said conveyor for the passage of air, an air deflecting drag member located over said conveyor and lying horizontally therewith and supported by fruit on said conveyor, means for supplying air or other drying medium to said distributing chamber under sufficient pressure to force said air upwardly through said conveyor to surround and contact with fruit thereon, said drag member holding said air around said fruit and causing it to travel with said fruit to prolong the contact therewith to permit it to absorb the maximum of moisture from said fruit.

2. An apparatus for drying fruit or the like comprising an endless conveyor made up of edge abutting slats for supporting and moving fruit, an open top air distributing chamber over which said conveyor moves and forms a substantial closure therefor, openings in said conveyor for the passage of air, an air deflecting drag member located over said conveyor and contacting with fruit on said conveyor while lying in horizontal relation thereto to form a confined area, means for supplying air to said distributing chamber under sufficient pressure to force said air upwardly through said conveyor into contact with said fruit, said drag member holding the air in and around said fruit and causing it to travel longitudinally therewith to prolong the contact whereby said confined air may absorb a maximum of moisture from said fruit.

3. A structure as specified in claim 2 in combination with means along the path of travel of said conveyor for causing a turning of the fruit thereon.

4. An apparatus for drying fruit or the like comprising a means for moving fruit through a horizontal path, an open top air distributing chamber over which said moving means travels and forms a substantial closure therefor, a series of longitudinally disposed air deflecting drag members located over said moving means and lying parallel thereto and supported by fruit moved thereby, said drag members being spaced along said path of moving fruit to form isolated drying areas through which the fruit is moved in succession, the air confined to each of said drying areas absorbing moisture from said fruit and being dissipated from contact with said fruit between said drying areas, so that the fruit in passing from area to area comes into contact with new air which gives a progressive drying to the fruit, means for supplying air to said drying chamber under sufficient pressure to cause it to percolate through said fruit, said drag members holding the air around said fruit and causing it to travel longitudinally therewith through said drying areas.

5. An apparatus for drying fruit or the like comprising an endless conveyor for supporting and conveying fruit, an open top air distributing chamber over which said conveyor moves and forms a substantial closure therefor, a series of spaced drying stations along the path of travel of said conveyor, the fruit being moved from station to station in regular sequence, means for supplying air to said distributing chamber in sufficient volume and force to move said air upwardly through said conveyor into contact with said fruit, each of said drying stations comprising a horizontally disposed air deflecting drag member having a free portion to lie parallel with said conveyor while resting on fruit thereon and acting to confine the air in close contact with the fruit while passing thereunder, to enable said air to absorb a maximum of moisture from the fruit, the space between drying stations permitting a dissipation of the moisture laden air from the fruit.

In testimony whereof, we have hereunto set our hands at Lindsay, California, this 31st day of December, 1928.

AUGUSTUS R. STEVENS.
FRANCIS M. STEVENS.